Jan. 22, 1957  G. EDWARDS  2,778,149
ANIMAL TRAP
Filed Sept. 27, 1954
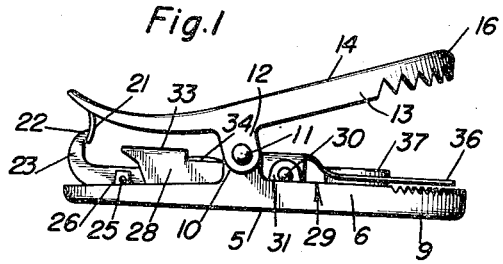
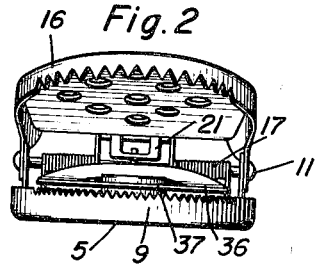
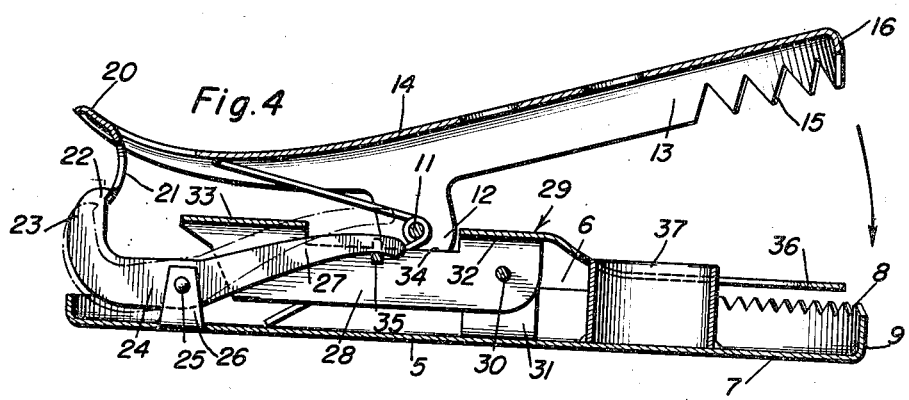
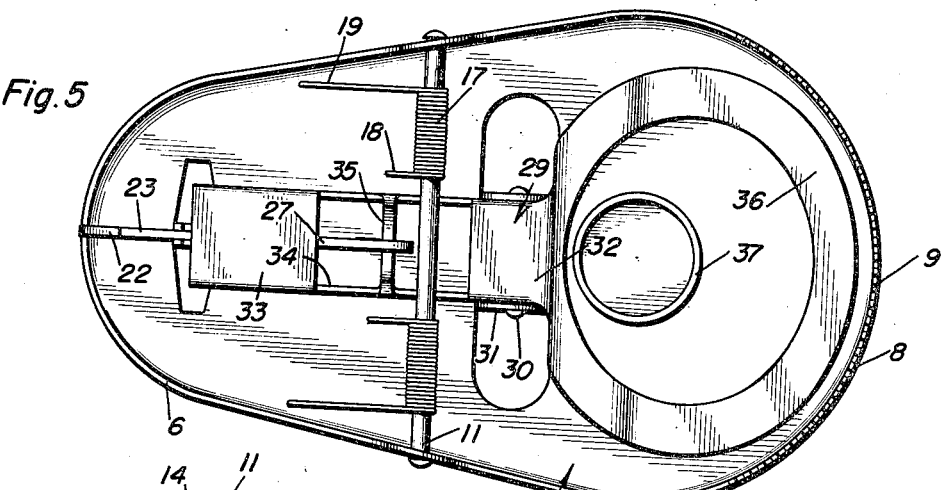
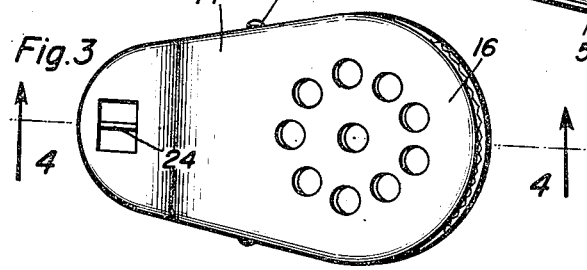
George Edwards
INVENTOR.

United States Patent Office 2,778,149
Patented Jan. 22, 1957

2,778,149

ANIMAL TRAP

George Edwards, Livingston, Mont.

Application September 27, 1954, Serial No. 458,450

1 Claim. (Cl. 43—83.5)

The present invention relates to new and useful improvements in animal traps of the trip released spring jaw type designed particularly for use in trapping mice or other relatively small animals.

An important object of the invention is to provide a bait cup mounted in a protected position between a pair of arcuate jaws to eliminate the objectionable practice of tying the bait to the bait holder or impaling the bait on a bait prong.

Another object is to provide a circular animal trip mechanism surrounding the bait cup for actuating the trip to close the trap jaws by the approach of an animal toward the bait from any direction.

A further object is to provide an animal trap of simple and practical construction, which is efficient and reliable in operation, relatively inexpensive to manufacture and otherwise well adapted for the purpose for which the same is intended.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a side elevational view;

Figure 2 is a front elevational views;

Figure 3 is a top plan view;

Figure 4 is an enlarged longitudinal sectional view taken on a line 4—4 of Figure 3; and Figure 5 is a plan view of the trap with the top jaw removed.

Referring now to the drawing in detail, wherein for the purpose of illustration I have disclosed a preferred embodiment of my invention, the numeral 5 designates a substantially ovate base plate of sheet metal or other suitable material and having an upstanding flange 6 at its marginal edges. The flange at the front wider end portion 7 of the base is formed with teeth 8 to provide a stationary lower jaw 9.

A pair of apertured ears 10 project upwardly from flange 6 at the side portions of the base and in which a transverse pin 11 is positioned for pivotally mounting a pair of apertured ears 12 thereon and which project downwardly from the side portions of a downwardly projecting flange 13 at the marginal edges of an upper ovate sheet metal or other suitable plate 14. Flange 13 at the wider front portion of plate 14 is also formed with teeth 15 to provide an upper pivoted jaw 16 coacting with lower jaw 9.

A pair of coil springs 17 are mounted on pin 11 with their end portions 18 and 19 tensionally engaging the base plate 5 and pivoted plate 14 to urge jaw 16 downwardly into closed position.

The rear end portion of pivoted plate 14 is curved upwardly to form a finger grip 20 having a downwardly projecting latch keeper loop 21 stamped therefrom and united therewith and adapted for engagement by a forwardly projecting lip or detent 22 at the upwardly projecting rear end portion 23 of a catch 24 which is pivoted at an intermediate portion on a pin 25 supported in a pair of upstanding apertured ears 26 stamped from the base plate 5 and united with the latter.

The front end portion 27 of catch 24 extends forwardly under pivoted plate 14 and between a pair of downwardly projecting parallel flanges 28 at the rear end portion of a trip designated generally at 29. The trip is pivoted on a pin 30 which is supported in a pair of upstanding apertured ears 31 stamped from base plate 5 and united therewith and front and rear webs 32 and 33 are integrally formed with the upper portion of the flanges 28 to rigidly connect the flanges to each other. The webs 32 and 33 are spaced from each other to form an opening 34 in the rear portion of trip 29 to accommodate the vertical swinging movement of the front end of catch 24. A cross bar 35 is suitably secured to the flanges 28 in opening 34 and underlies the front end of catch 24.

A trip ring 36 is integrally formed with the trip 29 and is positioned inside stationary jaw 9 and surrounds a bait cup 37 which is welded or otherwise suitably secured on top of base plate 5 centrally of jaw 9. Webs 32 and 33 counter-balance trip 29 to raise the trip ring 36, when the trap is set, and catch 24 is counter-balanced at its front end to raise the rear end 23 thereof and maintain lip 22 in the path of downward movement of keeper loop 21 for latching engagement thereof by a downward movement of the loop.

In the operation of the device, the finger grip 20 is pressed downwardly and keeper loop 21 rides downwardly against lip 22 at the upstanding rear end 23 of catch 24 to engage the lip in the loop to hold the jaw 16 raised in set position. When an animal approaches the bait in cup 37 and depresses ring 36 at the front end of trip 29 the cross bar 36 will raise the front end 27 of catch 24 and release lip 22 from loop 21 and springs 17 close jaw 16.

Since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

An animal trap comprising a base plate of ovate shape and having an upstanding toothed marginal flange at its front end forming a lower stationary jaw, a bait cup fixed on said base plate inwardly of the flange, an upper plate substantially coextensive in area to the base plate and pivoted to the latter and having a downwardly projecting toothed marginal flange at its front end forming a movable jaw coacting with the stationary jaw, an inverted channel-shaped trip pivoted at its central portion to the base plate and including a ring at its front end forming an elevated step surrounding the bait cup and positioned between the jaws, said trip including a pair of spaced apart parallel flanges, a cross bar supported by said flanges in a transverse position below the top of the trip, said cross bar being positioned on the trip at a point rearwardly of the pivot therefor, spring means closing the upper jaw, an elongated catch pivoted to the base plate and having a front end portion resting on top of the cross bar for actuation by the trip upon a depressing movement of the latter, an upwardly extending lip having a forwardly projecting detent at the rear end of the catch, and a downwardly projecting keeper at the rear portion of the upper plate engageable by the detent of said lip to secure the movable jaw in set position.

References Cited in the file of this patent

UNITED STATES PATENTS

| | | |
|---|---|---|
| 1,180,909 | Cunningham | Apr. 25, 1916 |
| 1,248,944 | Stilson | Dec. 4, 1917 |
| 1,675,532 | Cessna | July 3, 1928 |
| 1,919,527 | Orr | July 25, 1933 |
| 2,611,991 | Lehn | Sept. 30, 1952 |
| 2,724,209 | Cain | Nov. 22, 1955 |

FOREIGN PATENTS

| | | |
|---|---|---|
| 420,243 | Great Britain | 1934 |